United States Patent [19]

Rogers

[11] 3,840,341
[45] Oct. 8, 1974

[54] ORGANIC CARBON METHOD AND ANALYZER

[75] Inventor: Louis J. Rogers, Framingham, Mass.

[73] Assignee: Ionics, Incorporated, Watertown, Mass.

[22] Filed: Mar. 3, 1972

[21] Appl. No.: 231,690

[52] U.S. Cl. .......................... 23/230 PC, 23/253 PC
[51] Int. Cl. ...................... G01n 31/12, G01n 31/10
[58] Field of Search ...... 23/230 PC, 253 PC, 230 M

[56] References Cited
UNITED STATES PATENTS

| | | |
|---|---|---|
| 3,545,929 | 12/1970 | Linnenbom et al. ............ 23/230 PC |
| 3,672,841 | 6/1972 | Freeman et al. ................. 23/230 PC |
| 3,703,355 | 11/1972 | Takahashi et al. .............. 23/230 PC |

OTHER PUBLICATIONS

Dobbs et al., Analytical Chemistry, Vol. 39, No. 11 (1967), pp. 1,255–1,258.
Porter et al., Analytical Chemistry, Vol. 34, No. 7, June 1962, pp. 748–749.
Medsforth, J. Chem. Soc., Vol. 123, pp. 1,452–1,458, (1923).
Emery et al., "Total Organic Carbon Analyzer," Water Pollution Control Fed. J., (1971), Vol. 43 (9), pp. 1,834–1,844. POSL TD 730.A1 53.

Primary Examiner—Morris O. Wolk
Assistant Examiner—Timothy W. Hagan
Attorney, Agent, or Firm—Norman E. Saliba

[57] ABSTRACT

An improved apparatus and method for the automatic determination of total organic carbon in aqueous media. The invention comprises two sample injection valves, two reaction chambers, one for converting all carbon (both organic and inorganic) in the sample to carbon dioxide, the other for converting only the inorganic carbon to carbon dioxide, a methanizer for converting the formed carbon dioxide to methane and a flame ionization detector for measuring the quantity of the methane produced which corresponds to the total and the inorganic carbon content of the sample, the difference between these two values being the organic carbon content.

10 Claims, 1 Drawing Figure

PATENTED OCT 8 1974
3,840,341
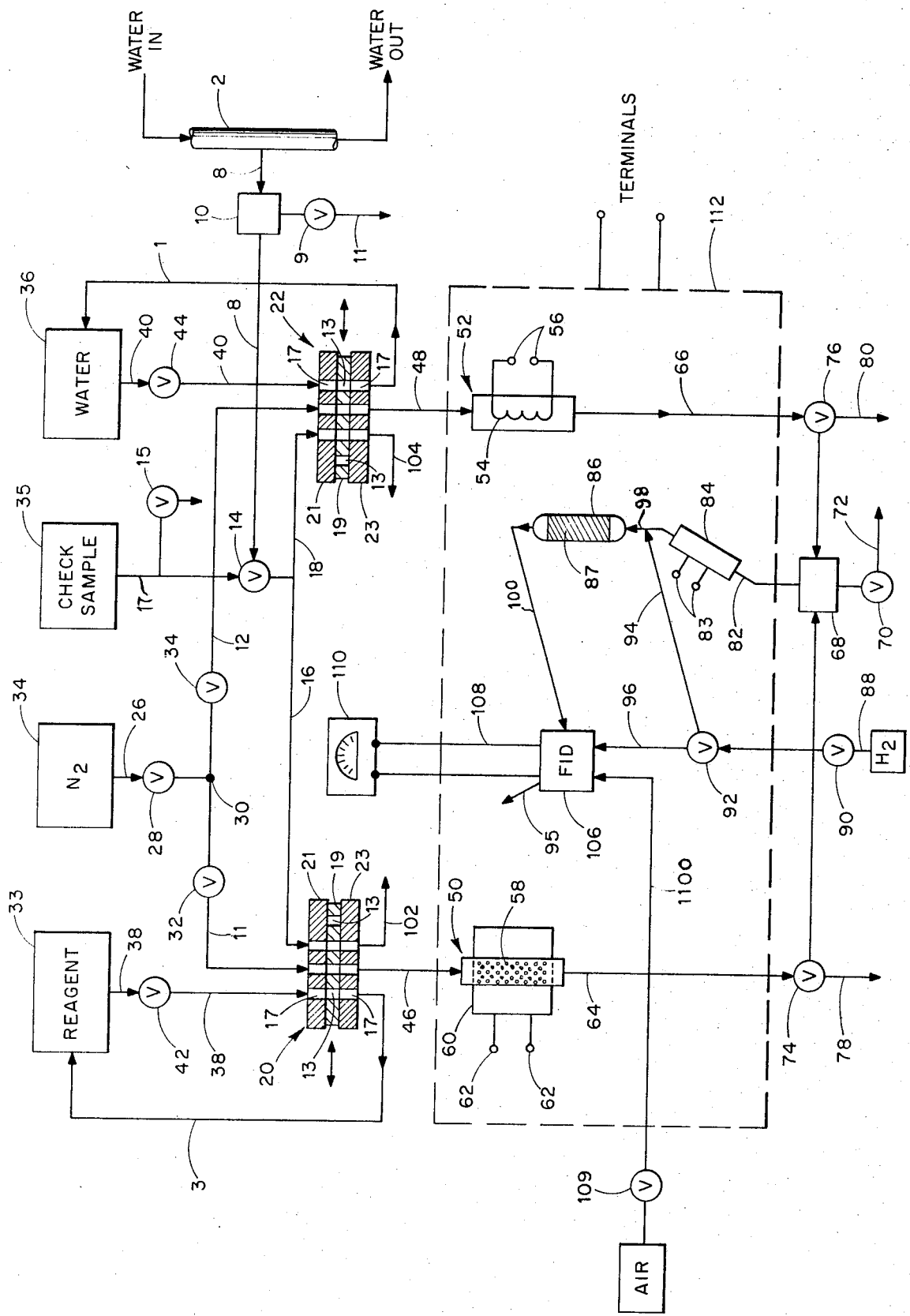

ORGANIC CARBON METHOD AND ANALYZER

The carbon content of influents to natural bodies of water is an important measure of the tendency of the influents to pollute said bodies of water. Dissolved organic carbonaceous matter represents a demand for the oxygen dissolved in natural receiving waters and thereby deprives the indigenous organisms of the oxygen necessary for maintenance of water purity and aquatic life.

Because of the importance of monitoring and controlling the carbon content of various influents to natural bodies of water, analyzers for measuring total carbon in the parts per million range have become essential for pollution control. At present, such carbon analyzers are commercially available and two types are fully disclosed in U.S. Pat. Nos. 3,296,435 and 3,530,292. The aforementioned devices function by periodically injecting a measured quantity of sample water onto a hot catalyst or into a rapid combustion chamber wherein all carbon bearing materials are converted to $CO_2$. This newly formed gaseous component is then swept by a carrier gas into a sensing system with the analyzer output signal being displayed by a recording or indicating device.

The analyzers so described both utilize a sensing system comprising a non-dispersive infrared detector to measure the concentration of carbon dioxide produced from the high temperature decomposition (either through combustion or catalytically) of the carbon containing substances in the liquid sample. This measured concentration of carbon dioxide can be related to the concentration of carbon in the sample by conventional calibration techniques. Furthermore, both analyzers measure only the total carbon automatically and not organic carbon. For the analysis of organic carbon each method requires a manual pretreatment of the sample, or a second channel for a separate inorganic carbon determination. This second channel involves a lower temperature reaction chamber where a measured quantity of water is periodically injected onto the heated acidic catalyst and vaporized; the inorganic components generating the product $CO_2$ in direct proportion to the number of carbon atoms they represent. Organic components are not affected. The resulting $CO_2$ gas is then swept into a non-dispersive infrared analyzer sensitized for $CO_2$, and the signal output displayed by an appropriate device.

The two readings of generated $CO_2$ obtained are usually scaled by conventional calibration procedures to read "parts per million" (ppm) by weight directly. A manual calculation is then made in order to subtract the carbon content of the inorganic carbon-containing materials (carbonates, bicarbonates, and carbon dioxides) from total carbon content in order to obtain the polluting organic carbon-containing materials.

The non-dispersive infrared type of detector heretofore utilized by the above described carbon analyzers has certain serious disadvantages. It is inherently expensive which tends to add to the financial burden of those responsible for the abatement of pollution. It is non-linear and therefore not only requires several calibration points for each range, but makes automatic electronic subtraction of signals virtually impossible if any reasonable degree of accuracy is to be maintained. It is limited in range, normally covering only two decades of range without special provisions for range changing. It is also difficult to maintain because it utilizes moving mechanical parts and optical windows which are easily subject to contamination.

Experimentation with several types of detectors has led to the conclusion that the hydrogen flame ionization detector would be most desirable from the standpoints of cost, reliability, linearity and ease of maintenance. Such a detector has been previously employed in an instrument which detects the fragments from the pyrolysis of aqueous carbonaceous materials. Extensive experimentation proved, however, that such an approach is not acceptable for the measurement of organic carbon. First, it was experimentally proven that different organic compounds gave drastically different output signals per mole of carbon when flowed through a 300°C. acidic reaction chamber into a hydrogen flame ionization detector. The output signals correlated qualitatively with the volatility and the stability of the compound. When the reaction chamber (either pyrolysis or catalytic) was operated at pyrolysis temperatures (700° – 900° C) the inorganic carbonaceous matter was also decomposed. This pyrolysis technique is inferior to the method of the present invention for carbon determination because of the well-known variation in sensitivity of the flame ionization detector to different carbonaceous compounds and pyrolysis fragments thereof.

As a result of the above experimentation, it was concluded that the most reliable method of converting all carbonaceous material of a sample to a single measurable substance is in the hereinabove mentioned U.S. Pat. No. 3,530,292 wherein a catalytic reaction (high temperature) chamber is operated in the vicinity of 850° C. to convert all carbonaceous matter (both organic and inorganic) to carbon dioxide. It was further concluded that the most reliable means for determining organic carbon is to separately (but automatically) measure the inorganic carbon content of the sample by means of a low temperature (150° – 300° C.) acidic reaction chamber. One such method and apparatus for effectively measuring inorganic carbon is fully disclosed in my co-pending application Ser. No. 097,707 now U.S. Pat. No. 3,672,841 issued June 27, 1972.

However, since both the high and low temperature reaction chambers convert carbon to carbon dioxide, and since the flame ionization detector is sensitive only to hydrocarbons and not to carbon dioxide, it therefore became necessary to convert the resulting carbon dioxide to methane in a methanizer or reduction chamber prior to passage into the flame ionization detector.

For this purpose a methanizer chamber containing a supported metallic nickel catalyst at a temperature range of about 275° – 400° C. in the presence of hydrogen was found to quantitatively convert carbon dioxide ($CO_2$) to methane ($CH_4$), even in the fraction of a part-per-million range. However, it was further found that the nickel catalyst rapidly lost its activity or sensitivity when the effluent from the reaction combustion chambers was passed over the nickel due to the presence in the effluent of water in the liquid state. Water is always present since it is a major combustion product in addition to carbon dioxide. Loss of efficiency in the nickel catalyst is noted when the peak heights for a given sample concentration have decreased or become non-linear with sample concentration.

It was discovered that the catalyst degradation could be overcome or considerably minimized by ensuring that all liquid water entering the methanation catalyst unit be in the vapor state. Where liquid water is not allowed to encounter the catalyst, excellent stability is obtained. A convenient and desirable way to accomplish this is to maintain all tubulations in the system from just prior to and including the methanation unit through to and including the flame ionization detector at a temperature above 100° C, preferably in the range of between 115° – 140° C. It was found that by such an arrangement all of the water produced within the high and low temperature reaction chambers if maintained in a vapor state could be tolerated by the thermostated methane conversion and detection system. Since, however, it is desirable to inject a further quantity of distilled rinse water into the reaction chambers between sample injections (to remove residual traces of any sample) it is preferred to include a condenser and a simple water separator after the reaction chambers but before the methanizer. This serves to eliminate a major portion of the liquid rinse water although, of course, it will not lower the water content to less than the saturated vapor level.

After each reaction chamber (the total carbon reaction chamber and inorganic carbon reaction chamber) had proved to operate satisfactorily with the methanizer-flame ionization detector system, tests were run to investigate the possibility of using a single flame ionization detector system for both reaction chambers. Unexpectedly, it was found that with proper timing the effluent from each reaction chamber could be separately carried along with an inert carrier gas such as nitrogen to a common point for the condensation and separation of water and that both signals could then be read separately by the flame ionization detector provided of course that the samples were not simultaneously injected into both reaction chambers. It was found that a double valve arrangement could be employed to connect the detection system to one reaction chamber during each half cycle. With such an arrangement, highly sensitive, accurate and repeatable measurements of total carbon and inorganic carbon were obtained such that the entire cycle (two sample injections, detection, and electronic subtraction of inorganic from total carbon to give organic carbon) could be completed in about 5 minutes.

In general, the organic carbon analyzer of the present invention is a dual channel automatic instrument for monitoring waste water or process streams. The organic carbon determination is made automatically by measuring both the total carbon and inorganic carbon content of the liquid and electronically subtracting the values. The instrument employs a single highly sensitive flame ionization detector whose output signal can be adapted to read carbon content in parts per million (mg./liter) on a recording strip or other indicating device.

In accordance with the present invention the instrument is fed a sample stream which is split into two branches each of which flows through its own precision metering valve. At the beginning of the analysis cycle a first metering valve injects an aliquot of sample for total carbon determination into a carrier gas stream which transports the liquid into a high temperature reactor where the carbonaceous materials are converted to carbon dioxide. The resulting gases pass through a condenser tube, where water vapor is removed and then into a second reactor containing a supported nickel catalyst. In this methanizer the $CO_2$ is catalytically combined with hydrogen to form methane, the concentration of which is then measured with a hydrogen flame ionization detector.

For the inorganic carbon determination, a second metering valve injects another sample into a low temperature reactor containing an acidic catalyst. This catalyst such as phosphoric acid converts all of the inorganic carbonates to $CO_2$ which is removed via the carrier gas stream along with the water vapor. The carrier gas stream then flows into the single methanizer and the resultant $CH_4$ peak is again measured by the same flame detector.

It is therefore an object of the present invention to provide a carbon analyzer which can be employed on small aqueous samples and which eliminates the necessity for a non-dispersive infrared detector. A further and important object of the invention is an analyzer comprising a unique assemblage of components which generate a linear output related to the measured variables and which therefore permits the automatic subtraction of resultant electrical signals of the inorganic carbon from the total carbon to give organic carbon as a direct output, and which carries out the entire analysis cycle within a short time period. A further object is to lessen the degradation of the methanization catalyst due to the presence of liquid water.

With the foregoing and other objects in view, which will become more apparent hereinafter, the invention will now be described with greater particularity and with reference to the drawing which shows in a single figure a schematic flow diagram illustrative of apparatus to perform the method according to the invention. For the purpose of simplicity the various valves, flowmeter, pressure regulators and gauges, switches, pumps, timers, thermocouples, etc. which one skilled in the art might employ in the practice of the present invention are not all fully illustrated in the drawing.

With reference to the single drawing there is shown a high temperature reaction furnace or chamber 52 operated in parallel with a low temperature reaction chamber 50, resulting in two trains (dual channel) feeding a single methanizer unit 86 and a single analyzer 106. A pair of flow selector control valves 22, 20 are provided for injecting a measured carbon containing water sample into the pair of reaction chambers which chambers communicate with a common gas-liquid separator 68 from which the carbon dioxide ($CO_2$) gas, generated in each reaction chamber is separately passed to the methanizer unit. The methane resulting therefrom is passed to the flame ionization detector 106 with the resulting measurement being recorded by a conventional recorder 110. Rinsing solutions are provided in the reservoirs 33, 36 which communicate with each of the selector control valves via conduit means 38, 40.

In accordance with the apparatus of the drawing, the instrument is fed a sample stream 8 of water through an optional filter 10 taken from the main stream 2 through rotating valve 14 after which the sample stream is split into two branches which pass through conduits 16, 18, each stream then flowing to its own flow selector injection valve 20 and 22. An electrical sequence timer (not shown) sequentially operates the two flow selector injection valves 20 and 22 to allow only one sample stream at one time to be diverted through to its respective reaction chamber, methanizer and analyzer. The filter, 10 if used, may be equipped with a conduit 11 containing a drain valve 9 for the purpose of cleaning the filter or in the alternate a self cleaning type of filter may be used. A carrier gas supply source 34 connects to gas supply conduit 26 and furnishes a high purity, dry gas through a pressure regulator valve 28 to a bifurcation point 30 from which a pair of carrier gas conduits 11 and 12 extend to the flow selector injection valves 20, 22. Adjustable restrictors or valves 32, 34 are located respectively in conduits 11, 12 to control flow of the carrier gas. Reservoir 33, 36 which are filled with a suitable rinsing liquid are connected respectively to the flow selector injection valves 20, 22 through supply conduits 38, 40 each conduit being provided with a valve 42, 44. Reservoir 36 contains distilled water for flushing out the high temperature total carbon selector injection valve 22 between sample stream injections. Reservoir 33 contains a distilled solution of an acidic reagent which is employed between sample injections to wash out the low temperature, inorganic carbon selector injection valve 20 and to replenish the acidic surface of the catalyst bed 58 contained within the low temperature reactor tube 50. Completing connections from the flow selector control injection valves is a pair of conduits 46, 48 extending to the inlets of the reaction chambers 50, 52. A reservoir 35 for checking out bottle samples of liquid or for the purpose of calibrating the apparatus connects to rotating valve 14 through a sample conduit 17. Fast dumping of the contents of check sample reservoir 35 may be effected through a drain valve 15.

The flow selector control injection valves 20, 22 are preferably of the sliding plate valve type although rotary valves, linear piston valves and the like are equally operable. The conventional sliding plate valve generally comprises a sliding plate 19 located between an upper 21 and a lower valve body portion 23 which can be pneumatically or electrically activated to provide a back and forth sliding motion position. The sliding plate 19 contains, as shown, precisely dimensioned passages 13 therein which communicate with ports 17 in the upper and lower valve body portions. When the sliding plate is activated to slide in one direction, a precise quantity of the sample stream from conduits 16, 18 flowing through a passage 13 is placed in communication with a carrier gas stream such as nitrogen supplied from a pressurized carrier gas source 34 whereby a precise volume of the water sample is injected into a reaction chamber. Various types of sliding plate valves and their method of operation are fully described in U.S. Pat. Nos. 2,757,541, 2,846,121, 3,160,015, 3,530,292 and others. An instrument air supply (not shown) regulated at the desired pressure and flow rate provides the actuating medium for both sliding plate valves. Electrical actuators, properly switched from a voltage source may be used equally effectively.

The high temperature reaction chamber 52 and low temperature reaction chamber 50 may be formed of tubes comprised of high silica glass or corrosion resistant metal such as Hastalloy (Trademark) with both reaction tubes containing a catalytic element or body. In the case of the high temperature reactor 52 employed for determining total carbon, a catalytic element 54 such as a coil of electrically conductive material (palladium, platinum etc.) is arranged within the combustion tube with electrical leads extending to electrical terminal 56 located external to the tube. Insulative material (not shown) is placed around the tubes to prevent heat loss. An alternate arrangement is one wherein a catalytic element such as copper oxide, or palladium deposited upon a porous substrate (or in configurations of high surface to volume ratio), or a finely divided transition metal such as fine platinum gauze is packed within the tube and retained therein as by the use of porous plugs such as glass wool at both ends of the tube. In this latter arrangement the packed catalyst may be maintained at the required temperature (about 850° C.) by fitting the tube within an electrical heating furnace so that the catalyst is completely located within the furnace.

The low temperature reaction chamber 50 employed for determining the inorganic carbon content of a liquid sample may be of similar construction but contains a catalyst bed 58 which will acidify the liquid sample to promote the conversion of inorganic carbons to $CO_2$. The catalyst bed may comprise a particulate solid material having an acidic surface or coating such as, for example, quartz chips, silica and the like coated with a non-volatile acid. The catalyst bed 58 is maintained at the required temperature (about 150° – 300° C.) by heating means 60 such as an electric oven or heating tape having terminals indicated at 62.

Conduits 64, 66 extend from the effluent ends of each respective reaction chamber 50, 52 to a common gas-liquid separator 68 provided with an automatic condensate dump valve 70 which periodically releases water into a drain conduit 72. The gas-liquid separator 68 receives the sample injection vapors in sequence from both reaction chambers and condenses excess water while allowing the water saturated nitrogen and $CO_2$ gas to flow into the auxiliary heater 84. Each of the effluent conduits 64, 66 may incorporate a diverter valve 74, 76 for diverting flush water condensate into drain conduits 78, 80. Conduit 82 extends from the outlet of the gas liquid separator 68 and enters the methanizer chamber 86 after first passing through an auxiliary heater 84 which may be a heat resistant tube such as glass wound with a resistance wire or which tubing may be located in a small heating furnace having terminals indicated at 83. In an alternate arrangement the auxiliary heater per se may be omitted whereby the $CO_2$ gas is swept by the nitrogen carrier gas up from the water separator 68 into the constant temperature compartment 112, through a heat exchanger such as tubing (not shown) wrapped around the high temperature oven to insure complete vaporization of all entrained water droplets and into the methanizer unit 86 where the $CO_2$ is converted to methane.

A hydrogen gas supply conduit 88 furnishes high purity hydrogen gas through a pressure regulator 90 to a distribution valve 92 from which gas conduit 94, extends. A second conduit 96 extending from the distributor valve 92 into the detector 106 is an optional arrangement for the purpose of supplying additional hydrogen to the detector if required. An electrolytic hydrogen generator is a convenient source of hydrogen where high pressure cylinders are not practical. Such generators are commercially available and require only distilled water and electrical power to produce ultra pure hydrogen. Hydrogen gas conduit 94 combines with conduit 98 prior to entering the methanizer chamber 86 where reduction of carbon dioxide occurs in the presence of the hydrogen and a hot reducing catalyst as follows:

$$4H_2 + CO_2 \rightarrow CH_4 + 2H_2O$$

The methanizer or catalytic converter unit 86 may comprise a heat resistant cylindrical tube or chamber constructed of stainless steel and containing a catalyst 87 which will reduce the $CO_2$ to methane ($CH_4$) in the presence of a suitable proportion of hydrogen. A catalyst of nickel which has been adsorbed or supported on firebrick is excellent for this purpose. A method of preparing a catalyst is fully described by K. Porter and D. H. Volman, Analytical Chemistry, Volume 34 (1962). A precious metal catalyst such as ruthenium or rhodium on alumina support is also appropriate. The methanization tube or chamber is surrounded by an electrical heating coil or electric furnace (not shown) for maintaining the nickel catalyst at an elevated temperature preferably between about 275° C. to 400° C.

The gas exiting from the methanizer is passed by way of a conduit 100 into the flame ionization detector 106. The flame ionization detector (FID) may be any one of the many commercially available types. Hydrogen is supplied as the burner gas to the FID directly through conduit 94 or indirectly through conduit 96 and extra dry air from a detector air source is also supplied to the FID (at a rate of about 650 – 750 C.C. per minute) through pressure regulator valve 109, via air detector conduit 1100. Air employed to support the hydrogen flame of the detector must first be made free of hydrocarbons. One method of accomplishing this is to pass the air through an absorbtion column and then through a heated catalyst bed where hydrocarbons not absorbed in the column will be converted to $CO_2$. However, dry oxygen may be employed over air for the combustion of the burner gas since it produces greater sensitivity in the detector. The FID is provided with output leads 108 connected to the necessary amplifying and recording equipment 110 for measuring the ionization of the methane.

The analysis subsystem, consisting of the high and low temperature reaction chambers 52, 50, methanizer 86 and flame detector 106, are preferably contained in a constant temperature controlled chamber or oven 112 so that fluctuations due to ambient temperature variations are eliminated. The temperature of the oven 112 can also be controlled to insure that any water entering the methanizer and on through the conduit tubings to the flame ionization detector is maintained in a vapor state at all times. The entire arrangement of the apparatus is controlled by a timer comprising an electric motor geared to a set of cams which actuate microswitches which in turn operate solenoid valves, alarms etc. in the pneumatic and system flow control lines.

When the sliding plates 19 of the flow selector control injection valves 20, 22 are in the position illustrated, a continuous stream of an aqueous sample flows in through conduit 8 splits into two approximate equal streams through conduits 16, 18 and then flows into the respective flow selector injection valves, through the flow-through passages and out to drains 102, 104. The carrier gas which may be an inert gas or an oxygen containing gas flows through conduit 26, valve 28, bifurcation point 30, then splitting into two streams which pass through valves 32, 34 via conduits 11, 12 and into the respective flow selector injection valves 20, 22, through the center flow passage into the respective reaction chambers 50, 52, to the common gas liquid separator 68, auxiliary heater 84, methanizer 86, into the analyzer 106 and out through a gas vent 95. Distilled water from reservoir 36, fills a closed loop 1 and a reagent such as a one molar solution of phosphoric acid from reservoir 33 also fills a closed loop 3.

At the beginning of the 5 minute analysis cycle which is programmed by a timer the high temperature flow selector injection valve 22 is actuated to move the sliding plate 19 to the right from the position shown in the drawing so that a quantity of water sample equal to the volume of a passage (about 40 microliters) is introduced into the carrier gas stream (such as nitrogen) and swept through conduit 48 into the high temperature (about 850° C.) reaction chamber 52 where the catalytically active element therein 54 vaporizes the water of the sample and converts all the carbon in the carbonaceous material into carbon dioxide. From the outlet end of the reactor 52, the gases and vapors proceed through conduit 66 and into the gas-liquid separator 68 wherein some water condenses out and is disposed of through a valve 70 and drain conduit 72. Continuing, the water saturated gas stream containing the $CO_2$ enters an auxiliary heater (above 100° C.) where further heating of the stream occurs insuring that all water entering the methanizer 86 is maintained in the vapor state. In the methanizer 86 containing a heated (about 350° C.) catalyst such as supported nickel, the $CO_2$ is catalytically combined with hydrogen to form methane. The required hydrogen is supplied just prior to the entrance of the methanizer via conduit 94 from a pressurized pure hydrogen source. The carrier gas now admixed with hydrogen continues along and carries the resulting methane into the hydrogen flame ionization detector 106 which is set to detect the methane concentration. The analyzer produces a read out indicia for example on a recording strip chart 110 which reading is made to be directly proportional to the total carbon content of the water sample.

The analysis for the inorganic carbon determination operates in a similar manner as the above described total carbon analysis. Approximately 2 minutes into the cycle, the low temperature flow selector valve 20 is actuated to move the sliding plate 19 to the left from the position illustrated so that another 40 microliter water sample is introduced into the carrier gas stream and carried through a conduit 46 into the low temperature (about 180° C.) reactor 50 containing an acidic catalyst 58 wherein the water sample is vaporized and all of the inorganic carbon component of the sample is converted by the action of the catalyst to $CO_2$. The catalyst is not sufficiently active to alter any of the organic compounds contained in the sample which organic compounds are carried by the carrier gas stream along with the $CO_2$ and residual water vapor into the gas liquid separator 68. This carrier gas stream then follows the same flow path as previously described with respect to the total carbon analysis with the resultant methane peak being measured by the single flame detector 106 and recorded on a strip chart as the inorganic carbon parameter.

The organic carbon determination is then made automatically by electronically subtracting the inorganic carbon measurement from the total carbon measurement and recording the same on a strip chart. Since the same detection system is utilized for both measurements and since the measurements are linear, the automatic subtraction gives highly accurate organic carbon values. The values of all three parameters are made continuously available as 0–5 volts DC analog signals.

Shortly after each water sample injection occurs for the carbon analysis, the sample inject lines to the high temperature reaction chamber 54 are swept out with pressurized carrier gas along with about a 100 microliters of distilled water from rinse reservoir 36 to remove components of the previous sample analysis (that may have adhered to the surfaces leading to the reaction chambers) and in general to clean the analyzer system.

On the low temperature side the rinse solution provided from reservoir 33 preferably comprises a solution of material corresponding to the acidic catalyst material 58 in reaction chamber 50. Thus, concurrently with flush cleaning of the reaction chamber 50, a precise quantity of an acidic solution is placed in contact with the heated catalyst to automatically replenish the acidic catalyst surface. The contacting of the heated catalyst (about 180° C) with the acidic rinse solution results in the vaporization of the rinse water portion simultaneously with the deposition of additional catalyst material onto the existing catalyst or support material which replenishes the amount of catalyst previously used up or washed away by the water sample being analyzed. Suitable catalyst materials include phosphoric acid, zinc chloride, sulfuric acid and other non-volatile acids and acidic salts such as ammonium bisulphate, benzoic acid and the like.

As described previously, sample water passes through both sample inject valves 20, 22 which valves are actuated simultaneously but for different purposes. Thus, for example, while the total carbon valve 22 moves to inject a 40 microliter sample into the reaction chamber 52, the inorganic carbon valve 20 moves simultaneously to its flush side and injects a 100 microliter sample of reagent bearing solution to the reaction chamber 50. The next actuation will reverse this process; i.e., the inorganic carbon valve will now inject a 40 microliter of water sample into the inorganic carbon reaction chamber, while the total carbon valve simultaneously injects a 100 microliter of distilled water (flush) into the total carbon reaction chamber. Coincidentally with the above, but a short preset time before these actuations occur, diverter valves 74 and 76 are also differentially actuated so as to cause flush liquids to be diverted out the drain conduits 78, 80 to allow only sample-related vapors to be admitted to the gas/liquid separator 68 and thence to the measuring system. Thus, while the total carbon valve 22 is injecting, the sample port of valve 76 seals off the diversion or drain path 80 and connects only to the separator 68. Simultaneously, a port of valve 74 connects the inorganic carbon valve flush effluent to the diversion or drain tubing 78 and seals off the passage to the separator 68. As outlined above, this process is reversed insofar as the functions of valve 74 and 76 are concerned during an inorganic carbon valve sample injection (with a corresponding total carbon distilled water "flush" injection).

EXAMPLE I

The purpose of this example was to test the validity of the total carbon channel in generating outputs which are of equal values in terms of the same parts-per-million of carbon in water regardless of the species of compound (i.e., organic, inorganic, volatile, stable, etc.). The following tests were run which resulted in the following normalized data:

Conditions:
High temperature "Total Carbon" reactor packed with palladium catalyst; with catalyst temperature approximately 850° C. Nitrogen carrier flow rate adjusted to 70 cc/minute. Hydrogen flow to methanizer about 50 cc/minute. Carbon content of test solutions = 100 ppm. carbon by weight.

| Compound | Chart Divisions (Average of at least six injections) | Deviation in percent from mean |
|---|---|---|
| Acetic Acid | 71.9 | +1.4 |
| Potassium Acid Phthalate | 68.9 | –2.8 |
| Hexamethylene Tetramine | 70.5 | –0.6 |
| Surcrose | 69.1 | –2.5 |
| Sodium Carbonate * | 71.5 | +0.9 |
| Methanol | 70.3 | –0.8 |

*Inorganic compound

EXAMPLE II

The purpose of this example was to test the validity of the inorganic carbon channel in generating outputs which are: (a) of equal values for equal parts-per-million samples of different inorganic compounds; and, (b) not readable for organic species. To this end a series of tests were run under the following conditions:

Low temperature "Inorganic Carbon" reactor containing (30/35 mesh) quartz chips coated with one molar phosphoric acid rinse. Catalyst temperature approximately 180° C. Nitrogen carrier flow rate = 70 cc/minute. Hydrogen flow to methanizer about 50 cc/minute. Carbon content (as shown below)

| Compound | Chart Divisions (Average of at least four injections) | Carbon Content (ppm) |
|---|---|---|
| Ammonium Carbonate | 85.8 | 100 |
| Ammonium Bicarbonate | 85.2 | 100 |
| Sodium Carbonate | 86.0 | 100 |
| Sodium Bicarbonate | 85.2 | 100 |
| Acetic Acid * | 0 (below 1) | 500 |
| Methanol * | 0 (below 1) | 500 |
| Potassium Acid Pthalate * | 0 (below 1) | 1000 |

*Organic compound

EXAMPLE III

To test the total operation of the organic carbon instrument in terms of mixtures containing both organic and inorganic carbon compounds in the following series of data were generated employing the conditions of Examples I and II. Because of the tremendous number of potential combinations and ranges, only practical numbers and species were chosen to prove the instruments's effectiveness.

| Organic Compound | Organic Carbon (ppm) | Inorganic Compound | Inorganic Carbon (ppm) | Total Carbon (ppm) | Measured Organic Carbon (ppm) Aver. of Readings |
|---|---|---|---|---|---|
| Acetic Acid | 405 | Sodium Carbonate | 45 | 450 | 408 |
| Acetic Acid | 4050 | Sodium Carbonate | 450 | 4500 | 4120 |
| Methanol | 405 | Ammonium Bicarbonate | 45 | 450 | 398 |
| Methanol | 450 | — | 0 | 450 | 448 |
| Potassium Acid Phthalate | 4500 | — | 0 | 4500 | 4430 |
| — | — | Sodium Bicarbonate | 45 | 45 | 0 |

The foregoing description is illustrative only and should not be taken in any limiting sense, it being possible in the light of this disclosure to have numerous alternatives within the spirit and scope of the invention which suggest themselves to a person familiar with the art. Accordingly the invention is defined according to the following appended claims.

The embodiments of the invention in which an exclusive property or privilege is claimed is defined as follows:

1. Apparatus for the automatic determination of total organic carbon in an aqueous solution comprising in combination a carrier gas supply source, a hydrogen gas supply source, a first automatic injection means for introducing a first aqueous solution sample and said carrier gas to a first reaction chamber containing a catalytically active body for producing carbon dioxide from the water and the total carbon content of said aqueous solution, a second automatic injection means for introducing a second aqueous solution sample and said carrier gas to a second reaction chamber containing a catalytically active body for producing carbon dioxide from the water and the inorganic carbon content of said aqueous solution, means for heating said first and second reaction chambers, means for separately passing each of said reaction chamber's effluent gaseous products and hydrogen gas into a methanizer chamber containing a catalytically active nickel body for producing methane by the reduction of carbon dioxide in the presence of hydrogen, heating means located upstream of the entrance of said methanizer chamber for preheating each of the said effluent gaseous streams prior to their entering into said methanizer chamber to a temperature sufficient to substantially maintain liquid water therein in a vapor state means for heating said methanizer chamber, passage means from said methanizer chamber to detection means sensitized to be responsive to methane and to produce separate indicia representative of the total carbon and inorganic carbon content respectively of said first and second samples, means to provide continuous passage of fluids through the apparatus components and electronic means for automatically determining the difference between said two separate carbon indicia to produce an additional indicia directly representative of the total organic carbon content of said aqueous solution.

2. The apparatus according to claim 1 wherein said heating means located upstream of the entrance of the said methanizer chamber comprises heat exchange tubing carrying the gaseous stream to be heated, said tubing being in close proximity to an oven employed as the heating means for any of said reaction chambers whereby the heat from said oven is sufficient to substantially maintain any water in said heat exchange tubing in a vapor state prior to passage of the gaseous stream into said methanizer chamber.

3. Apparatus according to claim 1 wherein the detection means comprises a flame ionization detector.

4. Apparatus according to claim 1 wherein means are provided for the removal of condensated liquids from the gaseous products of said first or second reaction chamber prior to the entrance of said gases into said methanizer chamber.

5. Apparatus according to claim 1 wherein the catalytic active body in said second reaction chamber comprises a particulate solid having an acidic coating thereon and wherein flushing means are provided for replenishing said acidic coating.

6. A method for the automatic determination of total organic carbon in an aqueous solution comprising the combination of steps of introducing a first aqueous sample to be analyzed into a confined stream of a carrier gas, directing the resulting mixture of said first aqueous sample and carrier gas to contact a first reaction chamber heated catalytic active body capable of producing carbon dioxide from the water and total carbon content in said first aqueous sample, introducing a second aqueous sample to be analyzed into a confined stream of carrier gas, directing the resulting mixture of said second aqueous sample and carrier gas to contact a second reaction chamber heated catalytic active body capable of producing carbon dioxide from the water and inorganic carbon content in said second aqueous sample, separately directing the gaseous mixture of the products of each of the reaction chambers and hydrogen to contact a reduction chamber heated catalytic nickel body capable of producing methane by the reduction of carbon dioxide in the presence of hydrogen, each of said gaseous mixtures being heated prior to entering said reduction chamber to a temperature sufficient to substantially maintain liquid water therein in a vapor state, by flame ionization analyzing for the said methane content of each gaseous mixture and in so doing produce separate indicia representative of the total carbon present in the said first sample and the inorganic carbon present in the said second sample and thereafter automatically determining the difference between the total carbon and inorganic carbon to directly obtain the total organic carbon content of said aqueous solution.

7. A method according to claim 6 wherein the carrier gas is selected from the group consisting of nitrogen, helium and argon.

8. A method according to claim 6 wherein the catalytic body in the reduction chamber is nickel adsorbed on fire brick and heated to a temperature between about 275° C. to 400° C.

9. A method according to claim 8 wherein the nickel catalyst is prevented from contacting liquid water by heating the said gaseous mixture stream prior to its entering said reduction chamber to a temperature sufficient to maintain any water of said stream in a vapor state.

10. A method according to claim 6 wherein an acidic washing fluid is employed for rinsing the said second reaction chamber's heated catalytic body.

* * * * *